US010385180B2

(12) United States Patent
Yoneyama et al.

(10) Patent No.: US 10,385,180 B2
(45) Date of Patent: Aug. 20, 2019

(54) PACKAGE OF POROUS FILM

(71) Applicant: Sumitomo Chemical Company, Limited, Tokyo (JP)

(72) Inventors: Satoshi Yoneyama, Niihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/025,262

(22) Filed: Jul. 2, 2018

(65) Prior Publication Data
US 2018/0305515 A1 Oct. 25, 2018

Related U.S. Application Data

(62) Division of application No. 15/529,823, filed as application No. PCT/JP2015/082654 on Nov. 20, 2015, now Pat. No. 10,047,208.

(30) Foreign Application Priority Data

Nov. 27, 2014 (JP) .................................. 2014-239597

(51) Int. Cl.
*H01M 2/16* (2006.01)
*H01M 2/08* (2006.01)
(Continued)

(52) U.S. Cl.
CPC .................. *C08J 9/28* (2013.01); *C08J 7/047* (2013.01); *C08J 9/36* (2013.01); *H01M 2/145* (2013.01);
(Continued)

(58) Field of Classification Search
CPC ...... C08J 2323/06; H01M 2/145; H01M 2/16; H01M 4/13; H01M 10/0525
See application file for complete search history.

(56) References Cited

U.S. PATENT DOCUMENTS 4,852,732 A * 8/1989 Wilski .................. B65D 81/26
206/204
6,511,774 B1 1/2003 Tsukuda et al.
(Continued)

FOREIGN PATENT DOCUMENTS

CN 1216163 A 5/1999
CN 203293607 U 11/2013
(Continued)

OTHER PUBLICATIONS

Harris et al., "High-Speed Thin Film Humidity Sensors," Electrochemical and Solid-State Letters, 5 (11) H27-H29. (Year: 2002).*
(Continued)

*Primary Examiner* — Kara B Boyle
(74) *Attorney, Agent, or Firm* — Panitch Schwarze Belisario & Nadel LLP

(57) ABSTRACT

A method for producing a porous film having a water content percentage of less than 1000 ppm, the method including the steps of: (1) obtaining a porous film (A) having a water content percentage of not less than 1000 ppm; (2) obtaining a package by causing the obtained porous film (A) and a drying agent to be contained in a water vapor barrier packaging container and sealing the water vapor barrier packaging container; and (3) storing the obtained package.

8 Claims, 1 Drawing Sheet

(51) Int. Cl.
  *C08J 9/28* (2006.01)
  *C08J 9/36* (2006.01)
  *H01M 4/13* (2010.01)
  *C08J 7/04* (2006.01)
  *H01M 2/14* (2006.01)
  *H01M 10/0525* (2010.01)

(52) U.S. Cl.
  CPC ............... *H01M 2/16* (2013.01); *H01M 4/13* (2013.01); *C08J 2323/06* (2013.01); *C08J 2401/08* (2013.01); *H01M 10/0525* (2013.01); *H01M 2300/002* (2013.01)

(56) References Cited

U.S. PATENT DOCUMENTS

| | | |
|---|---|---|
| 2010/0015497 A1 | 1/2010 | Hamada et al. |
| 2010/0068612 A1 | 3/2010 | Nishikawa |
| 2011/0165450 A1 | 7/2011 | Nishikawa |
| 2011/0165469 A1 | 7/2011 | Nishikawa |
| 2013/0089772 A1 | 4/2013 | Nishikawa |
| 2016/0036027 A1 | 2/2016 | Nishikawa |

FOREIGN PATENT DOCUMENTS

| | | |
|---|---|---|
| CN | 104070726 A | 10/2014 |
| JP | 2004-175440 A | 6/2004 |
| JP | 2006-82399 A | 3/2006 |
| JP | 2007-35615 A | 2/2007 |
| JP | 2008-207812 A | 9/2008 |
| JP | 2009-021265 A | 1/2009 |
| JP | 4303307 B2 | 7/2009 |
| JP | 2010-123465 A | 6/2010 |
| JP | 2010232048 A | 10/2010 |
| JP | 2011140633 A | 7/2011 |
| JP | 4988972 B1 | 8/2012 |
| JP | 2013026149 A | 2/2013 |
| JP | 2013159377 A | 8/2013 |
| JP | 2013-203458 A | 10/2013 |
| JP | 2014-32906 A | 2/2014 |
| JP | 2014019056 A | 2/2014 |
| JP | 2014026946 A | 2/2014 |
| JP | 2014-154475 A | 8/2014 |

OTHER PUBLICATIONS

Office Action dated Nov. 27, 2018 in JP Application No. 2017-155067.
Harris et al., "High-Speed Porous Thin film Humidity Sensors," Electrochemical and Solid-State Letters, vol. 5, No. 11, pp. H27-H29 (2002).
Int'l Preliminary Report on Patentability dated May 30, 2017 in Int'l Application No. PCT/JP2015/082654.
Int'l Search Report dated Feb. 23, 2016 in Int'l Application No. PCT/JP2015/082654.
Notice of Allowance dated Apr. 20, 2018 in U.S. Appl. No. 15/529,823, by Yoneyama.
Office Action dated Mar. 5, 2019 in KR Application No. 10-2017-7014819 (Full English Translation).

* cited by examiner

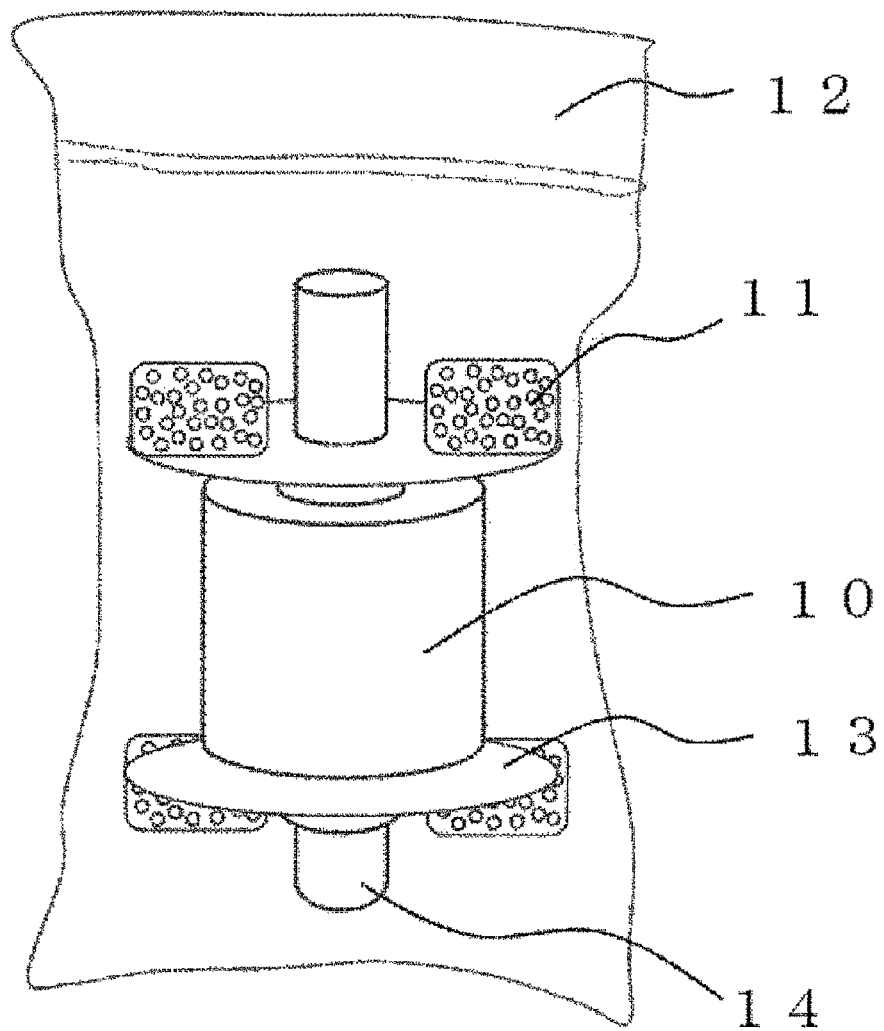

PACKAGE OF POROUS FILM

CROSS-REFERENCE TO RELATED APPLICATION

This application is a Division of co-pending U.S. patent application Ser. No. 15/529,823 filed May 25, 2017, which was a Section 371 of International Application No. PCT/JP2015/082654, filed Nov. 20, 2015, which was published in the Japanese language on Jun. 2, 2016 under International Publication No. WO 2016/084726 A1, which claims priority under 35 U.S.C. § 119(b) to Japanese Application No. 2014-239597, filed Nov. 27, 2014, the disclosures of which are incorporated herein by reference in their entirety.

TECHNICAL FIELD

The present invention relates to a method for producing a porous film.

BACKGROUND ART

Nonaqueous electrolyte solution secondary batteries, especially lithium ion secondary batteries, each of which has a high energy density, have been widely used as batteries for use in, for example, a personal computer, a mobile phone, and a portable information terminal.

A nonaqueous electrolyte solution secondary battery, typified by a lithium ion secondary battery has a high energy density. Thus, in a case where an internal short circuit occurs due to, for example, a breakage in the battery or penetration of a foreign matter, a large electric current flows and the battery generates a high heat. This requires a nonaqueous electrolyte solution secondary battery to have a function of preventing generation of heat having a level equal to or higher than a certain level. Known examples of a nonaqueous electrolyte solution secondary battery having such a function include a battery including a separator having a shutdown function. The shutdown function is a function of causing a separator to block passage of ions between a cathode and an anode during abnormal heat generation. This function makes it possible to prevent further heat generation.

Proposed examples of such a separator having the shutdown function include a porous film including a shutdown layer containing polyolefin as a main component; a porous film including a shutdown layer containing polyolefin as a main component and a heat-resistant layer containing a heat-resistant resin (Patent Literature 1); a porous film including a shutdown layer containing polyolefin as a main component and an adhesive layer containing an adhesive resin (Patent Literature 2); and the like.

Since a porous film is porous and has a large surface area in which water adheres to the porous film, the porous film easily contains moisture. It is known that a separator which contains much moisture causes dissolution of the moisture into an electrolyte solution and promotes generation of, for example, hydrogen fluoride and decomposition of the electrolyte solution. Thus, an amount of moisture contained in a separator is preferably maintained at a level as low as possible.

It is known that moisture contained in a porous film is removed by, for example, vacuum drying or heat drying.

CITATION LIST

Patent Literatures

[Patent Literature 1]
Japanese Patent Application Publication Tokukai No. 2009-021265
[Patent Literature 2]
Japanese Patent No. 4988972

SUMMARY OF INVENTION

Technical Problem

Note, however, that vacuum drying or heat drying carried out so as to remove moisture contained in a porous film allows the porous film to contain a smaller amount of moisture, but may deform (e.g., warp) the porous film. Such deformation in the porous film causes a deterioration in workability during manufacturing of a battery.

Solution to Problem

An aspect of the present invention includes the following inventions.
[1] A method for producing a porous film having a water content percentage of less than 1000 ppm, the method including the steps of: (1) obtaining a porous film (A) having a water content percentage of not less than 1000 ppm; (2) obtaining a package by causing the obtained porous film (A) and a drying agent to be contained in a water vapor barrier packaging container and sealing the water vapor barrier packaging container; and (3) storing the obtained package.
[2] The method as set forth in [1], wherein the water vapor barrier packaging container has a water vapor transmittance of 0.1 g/m$^2$/24 hr to 5 g/m$^2$/24 hr at a temperature of 40° C. and a humidity of 90% RH.
[3] The method as set forth in [1] or [2], wherein the drying agent is contained in the water vapor barrier packaging container in an amount of not less than X mass % with respect to a mass of the porous film (A), the X being calculated based on the following equation (I):

$$X = Y/(a \times 100) \quad \text{(I)}$$

where a represents an amount of moisture absorption (g) per 100 g of the drying agent at a temperature of 24° C. and a humidity of 10%, and Y represents a water content percentage (ppm) of the porous film (A).
[4] The method as set forth in any one of [1] through [3], wherein the porous film is a nonaqueous secondary battery separator.
[5] A package obtained by causing a roll porous film having a water content percentage of less than 1000 ppm and a drying agent to be contained in a water vapor barrier packaging container and sealing the water vapor barrier packaging container.
[6] The package as set forth in [5], wherein the drying agent has a water content percentage of not less than 10000 ppm.
[7] The package as set forth in [5] or [6], wherein the water vapor barrier packaging container has a water vapor transmittance of 0.1 g/m$^2$/24 hr to 5 g/m$^2$/24 hr at a temperature of 40° C. and a humidity of 90% RH.
[8] The package as set forth in any one of [5] through [7], wherein the drying agent is contained in an amount of not less than 51 g and not more than 2530 g.
[9] The package as set forth in any one of [5] through [8], wherein the roll porous film having a water content percentage of less than 1000 ppm is a nonaqueous secondary battery separator.
[10] The package as set forth in any one of [5] through [9], wherein the drying agent is fixed to a member different from the roll porous film.

Advantageous Effects of Invention

An aspect of the present invention makes it possible to produce a porous film which has a low water content percentage and in which deformation such as warpage less occurs. Such a porous film allows an improvement in workability of assembling a battery.

BRIEF DESCRIPTION OF DRAWINGS

FIG. 1 schematically illustrates a package in accordance with an aspect of the present invention.

DESCRIPTION OF EMBODIMENTS

[1. Porous Film]

A porous film of an aspect of the present invention can be a porous film including only a first porous layer, or a porous film including a stack of a first porous layer and another porous layer (hereinafter may be referred to as a "second porous layer").

The porous film of an aspect of the present invention can be used as a separator (e.g., a separator for a nonaqueous electrolyte solution secondary battery). The porous film has a total thickness preferably of 5 μm to 50 μm, and more preferably of 10 μm to 35 μm, from the viewpoint of mechanical strength and energy density of the porous film which is included in a battery.

The porous film preferably has a porosity of 30 vol % to 60 vol % from the viewpoint of adhesion to an electrode, handleability, mechanical strength, and ion permeability.

The porous film preferably has a Gurley value (JIS P8117) in a range of 50 seconds/100 cc to 1000 seconds/100 cc. This is because the porous film which has a Gurley value falling within the above range achieves a good balance between mechanical strength and film resistance. In a case where the porous film includes the first porous layer and the second porous layer, from the viewpoint of ion permeability, a difference between (a) a Gurley value of the first porous layer and (b) a Gurley value of the whole of the porous film which includes the first porous layer and the second porous layer is preferably not more than 300 seconds/100 cc, more preferably not more than 150 seconds/100 cc, and still more preferably not more than 100 seconds/100 cc.

The porous film preferably has a film resistance of 0.1 ohm·cm$^2$ to 5 ohm·cm$^2$ from the viewpoint of load characteristics of the battery. The film resistance herein refers to a resistance value obtained in a case where the separator is impregnated with an electrolyte solution, and is measured by an alternating current method. Though varying depending on a kind of electrolyte solution and on temperature as a matter of course, the above numerical value is a numerical value measured at 20° C. by using 1 mol/L LiBF$_4$-propylene carbonate/ethylene carbonate (mass ratio: 1/1) as an electrolyte solution.

The porous film preferably has a thermal shrinkage rate at 105° C. of not more than 10% in each of a machine direction (MD) and a transverse direction (TD). The thermal shrinkage rate which falls within this range allows shape stability of the separator and a shutdown characteristic of the separator to be balanced. The thermal shrinkage rate is more preferably not more than 5%.

[2-1. First Porous Layer]

The first porous layer only needs to be a microporous film and preferably contains a polyolefin-based resin as a main component. That is, the first porous layer is preferably a porous film that (i) contains a polyolefin-based resin as a main component, (ii) is structured to have therein pores connected to one another, and (iii) allows a gas and a liquid to pass therethrough from one surface to the other. The first porous layer can also be arranged as below. Specifically, in a case where the battery generates heat, the first porous layer is melted so as to make the porous film (i.e., the separator) non-porous, so that the first porous layer can impart a shutdown function to the porous film. A main component herein refers to a component contained in an amount of not less than 50 mass % to a total amount.

The first porous layer preferably contains a polyolefin-based resin in a proportion normally of not less than 50 vol %, preferably of not less than 90 vol %, and more preferably of not less than 95 vol %, with respect to the whole of the first porous layer. The first porous layer preferably contains a high molecular weight polyolefin-based resin having a weight-average molecular weight of $5\times10^5$ to $15\times10^6$. The first porous layer particularly preferably contains a polyolefin-based resin having a weight-average molecular weight of not less than 1,000,000. This is because (i) the first porous layer which contains such a polyolefin-based resin and (ii) the whole of the porous film which includes the first porous layer have a higher strength.

Examples of the polyolefin-based resin include high molecular weight homopolymers obtained by polymerizing ethylene, propylene, 1-butene, 4-methyl-1-pentene, 1-hexene, or the like; and copolymers of these monomers. The first porous layer can be a layer containing any one of these polyolefin-based resins alone and a layer containing two or more of these polyolefin-based resins. In particular, a high molecular weight polyethylene containing ethylene as a main component is preferable. Note that the first porous layer is not prevented from containing other component(s) different from a polyolefin-based resin, provided that the other component(s) does/do not impair a function of the first porous layer.

The first porous layer is structured to have therein pores connected to one another, and allows a gas, a liquid, an ion, and the like to pass therethrough from one surface to the other. A transmittance of the first porous layer is normally expressed in an air permeability. The first porous layer has an air permeability in a range normally of 30 sec/100 cc to 1000 sec/100 cc, and preferably of 50 sec/100 cc to 800 sec/100 cc, in terms of Gurley values. The first porous layer which has an air permeability falling within the above range achieves sufficient ion permeability in a case where the first porous layer is used in the separator.

The first porous layer has a porosity preferably of 20 vol % to 80 vol %, and more preferably of 30 vol % to 70 vol %. This is because such a first porous layer allows the separator to (i) retain a larger amount of electrolyte solution and (ii) achieve the shutdown function without fail. The first porous layer which has a porosity of less than 20 vol % may cause a decrease in amount of electrolyte solution retained by the separator. Meanwhile, the first porous layer which has a porosity of more than 80 vol % may make the separator insufficiently non-porous at a high temperature at which shutdown occurs. That is, such a first porous layer may make it impossible to cut off an electric current in a case where the battery generates a high heat.

The first porous layer has an average pore size preferably of not more than 0.3 μm, and more preferably of not more than 0.15 μm. This is because in a case where the separator of an aspect of the present invention which separator includes such a first porous layer is included in the battery, it is possible to achieve sufficient ion permeability and to prevent particles from entering a cathode or an anode.

A thickness of the first porous layer is appropriately selected in view of the number of layers included in the porous film. From the viewpoint of mechanical strength and energy density of the porous film which is included in the battery, the porous film which includes only the first porous layer has a thickness preferably of 5 µm to 50 µm, and more preferably of 10 µm to 35 µm. In a case where the first porous layer is used as a base material and the second porous layer is formed on one surface (or each of both surfaces) of the first porous layer, the first porous layer has a thickness preferably of 4 µm to 40 µm, and more preferably of 5 µm to 30 µm. The first porous layer which has a thickness of less than 4 µm may have an insufficient strength. Meanwhile, the first porous layer which has a thickness of more than 40 µm may lead to a small battery capacity due to its too large thickness.

The first porous layer has a weight per unit area normally of 4 $g/m^2$ to 15 $g/m^2$, and preferably of 5 $g/m^2$ to 12 $g/m^2$. This is because such a first porous layer allows an increase in strength, thickness, handleability, and weight of the porous film and also allows an increase in weight energy density and/or volume energy density in a case where the first porous layer is used in the separator of the battery.

Suitable examples of such a first porous layer include a porous polyolefin layer disclosed in Japanese Patent Application Publication, Tokukai, No. 2013-14017 A, a polyolefin porous film disclosed in Japanese Patent Application Publication, Tokukai, No. 2012-54229 A, and a polyolefin base porous film disclosed in Japanese Patent Application Publication, Tokukai, No. 2014-040580 A.

The first porous layer can be produced by any publicly known method. For example, as disclosed in Japanese Patent Application Publication, Tokukaihei, No. 7-29563 A (1995), the first porous layer can be produced by a method in which a film is formed from a thermoplastic resin to which a plasticizing agent is added, and then the plasticizing agent is removed by use of an appropriate solvent.

Specifically, assume, for example, that the first porous layer is formed from a polyolefin resin containing an ultra-high molecular weight polyethylene and a low molecular weight polyolefin having a weight-average molecular weight of not more than 10,000. In this case, from the viewpoint of production cost, the first porous layer is preferably produced by the method below including the steps of:

(a) obtaining a polyolefin resin composition by kneading (i) 100 parts by weight of the ultra-high molecular weight polyethylene, (ii) 5 parts by weight to 200 parts by weight of the low molecular weight polyolefin having a weight-average molecular weight of not more than 10,000, and (iii) 100 parts by weight to 400 parts by weight of an inorganic filler such as calcium carbonate;

(b) forming the polyolefin resin composition into a sheet;

(c) removing the inorganic filler from the sheet obtained in the step (b); and (d) obtaining the first porous layer by stretching the sheet obtained in the step (c).

The first porous layer can be produced by not only the above method but also any of the methods described in the above-mentioned Patent Literatures.

Alternatively, it is possible to use, as the first porous layer, a commercially available product having the characteristics described earlier.

The first porous layer, which changes in water content percentage in accordance with a raw material thereof, normally has a water content percentage of not less than 1000 ppm in a case where the porous film is stored in an environment at a temperature of 24° C. and a humidity of 50%. In particular, the first porous layer which is hydrophilized by, for example, a hydrophilization treatment (described later) tends to have a high water content percentage.

[2-2. Second Porous Layer]

The second porous layer can be a layer that (i) is structured to have therein many micropores connected to one another and (ii) allows a gas and a liquid to pass therethrough from one surface to the other. Further, the second porous layer can be a layer that (i) is provided on one surface or each of both surfaces of the first porous layer as an outermost layer of the porous film and (ii) can adhere to the electrode in a case where the second porous layer is used in the separator.

The second porous layer, which changes in water content percentage in accordance with a raw material thereof, normally has a water content percentage of not less than 1000 ppm in a case where the porous film is stored in an environment at a temperature of 24° C. and a humidity of 50%. In particular, the second porous layer which contains a highly hydrophilic resin and/or a highly hydrophilic filler tends to have a high water content percentage.

The second porous layer is preferably structured to be made sufficiently porous from the viewpoint of ion permeability. Specifically, the second porous layer preferably has a porosity of 30 vol % to 80 vol %. The second porous layer preferably has an average pore size of 0.02 µm to 0.5 µm.

From the viewpoint of adhesion to the electrode and ion permeability, the second porous layer preferably has a weight per unit area of 0.5 $g/m^2$ to 20 $g/m^2$ on one surface of the first porous layer.

The second porous layer can include a plurality of layers. For example, the second porous layer can be arranged to include at least one of a heat-resistant layer and a functional layer. In a case where the second porous layer includes the heat-resistant layer and the functional layer, the heat-resistant layer can be provided between the first porous layer and the functional layer (i.e., a laminated body including the first porous layer, the heat-resistant layer, and the functional layer which are stacked in this order is obtained). A laminated body in accordance with another aspect of the present invention can be arranged to include the first porous layer, the functional layer, and the heat-resistant layer which are stacked in this order. A laminated body in accordance with still another aspect of the present invention can have a structure in which the first porous layer is sandwiched between the functional layer and the heat-resistant layer (that is, the heat-resistant layer, the first porous layer, and the functional layer are stacked in this order). Note, however, that the second porous layer is preferably arranged to include only the functional layer so that the separator has a small thickness. This is because the second porous layer thus arranged contributes to achievement of a higher capacity of the battery.

The following description discusses the functional layer and the heat-resistant layer.

<Functional Layer>

The functional layer is a layer that has a function different from that possessed by the first porous layer or the heat-resistant layer. Examples of such a function include, for example, adhesion, protection, and a shutdown function carried out at a temperature lower than a temperature at which the shutdown function is carried out in first porous layer.

In order that such a function of the functional layer as mentioned above is sufficiently carried out in the functional layer, the functional layer has a thickness preferably of 0.5 µm to 10 µm, and more preferably of 1 µm to 5 µm. In a case where the porous film includes a plurality of functional layers, the plurality of functional layers only needs to have a total thickness falling within the above range.

First Embodiment

The functional layer included in the second porous layer is exemplified by, for example, a functional layer having a structure in which skeletons each having a diameter of not more than 1 μm are connected to one another in a form of a three-dimensional network. The functional layer having the structure is preferably made of a polyvinylidene fluoride-based resin (hereinafter, such a resin may also be simply referred to as a "PVDF-based resin"). The porous film which includes such a functional layer is excellent in ion permeability and handleability, and makes it possible to achieve good adhesion between the porous film and an electrode which are bonded together by hot pressing.

Examples of the PVDF-based resin include homopolymers of vinylidene fluoride (i.e., polyvinylidene fluoride); copolymers of vinylidene fluoride and other monomer(s) copolymerizable with vinylidene fluoride (e.g., a polyvinylidene fluoride copolymer); and mixtures of these polymers. Examples of a monomer copolymerizable with vinylidene fluoride include hexafluoropropylene, tetrafluoroethylene, trifluoroethylene, trichloroethylene, vinyl fluoride, and the like. It is possible to use one kind or two or more kinds of monomer(s) selected from the above monomers. The PVDF-based resin can be synthesized by emulsion polymerization or suspension polymerization.

The PVDF-based resin preferably contains, as a component thereof, vinylidene fluoride in an amount of not less than 95 mol % (more preferably of not less than 98 mol %). The PVDF-based resin which contains vinylidene fluoride in an amount of not less than 95 mol % makes it easy for the porous film to achieve mechanical strength and heat resistance which are resistant to a pressure and heat, respectively, applied during battery production.

An aspect of the functional layer which contains two kinds of PVDF-based resins (a first resin and a second resin below) that are different from each other in hexafluoropropylene content.

The first resin is (i) a vinylidene fluoride-hexafluoropropylene copolymer containing hexafluoropropylene in an amount of more than 0 mol % and not more than 1.5 mol % or (ii) a vinylidene fluoride homopolymer (containing hexafluoropropylene in an amount of 0 mol %).

The second resin is a vinylidene fluoride-hexafluoropropylene copolymer containing hexafluoropropylene in an amount of more than 1.5 mol %.

The functional layer which contains the two kinds of PVDF-based resins more closely adheres to the electrode as compared with the functional layer which does not contain one of the two kinds of PVDF-based resins. Further, the functional layer which contains the two kinds of PVDF-based resins more closely adheres to the first porous layer and is more easily separated from the first porous layer, as compared with the functional layer which does not contain one of the two kinds of PVDF-based resins. The first resin and the second resin are preferably mixed at a mixing ratio (mass ratio, ratio between first resin and second resin) of 15:85 to 85:15.

The PVDF-based resin preferably has a weight-average molecular weight of 300,000 to 3,000,000. The PVDF-based resin which has a weight-average molecular weight of not less than 300,000 allows the second porous layer to have a dynamic characteristic that allows the second porous layer to withstand a process for causing the second porous layer to closely adhere to the electrode, so that the second porous layer and the electrode sufficiently closely adhere to each other. Meanwhile, the PVDF-based resin which has a weight-average molecular weight of not more than 3,000,000 prevents a coating solution that is to be applied so as to form the second porous layer from having a too high viscosity, so that the coating solution is excellent in formability. The PVDF-based resin has a weight-average molecular weight more preferably of 300,000 to 2,000,000, and still more preferably of 500,000 to 1,500,000.

The PVDF-based resin preferably has a fibril diameter of 10 nm to 1000 nm from the viewpoint of a cycle characteristic.

The functional layer can contain other resin(s) different from the PVDF-based resin. Examples of the other resin(s) include styrene-butadiene copolymers; homopolymers or copolymers of vinyl nitriles such as acrylonitrile and methacrylonitrile; polyethers such as polyethylene oxide and polypropylene oxide; and the like.

Further, the functional layer can contain a filler. The functional layer which contains the filler allows an improvement in slidability and/or heat resistance of the porous film. The filler can be either of an organic filler and an inorganic filler each of which is stable in a nonaqueous electrolyte solution and is electrochemically stable.

Examples of the organic filler include crosslinked high molecule fine particles such as crosslinked polyacrylic acid, crosslinked polyacrylic acid ester, crosslinked polymethacrylic acid, crosslinked polymethacrylic acid ester, crosslinked polymethyl methacrylate, crosslinked polysilicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; heat-resistant high molecule fine particles such as polysulfone, polyacrylonitrile, polyaramid, polyacetal, and thermoplastic polyimide; and the like.

A resin (high molecule) contained in the organic filler can be a mixture, a modified product, a derivative, a copolymer (a random copolymer, an alternating copolymer, a block copolymer, or a graft copolymer), or a crosslinked product of any of the molecular species listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia; carbonates such as calcium carbonate and magnesium carbonate; sulfates such as barium sulfate and calcium sulfate; clay minerals such as calcium silicate and talc; and the like. Among these inorganic fillers, a metal hydroxide or a metal oxide is preferable from the viewpoint of bringing about (i) flame retardancy in the porous film and/or (ii) an antistatic effect.

The above fillers can be used alone in one kind or can be used in combination of two or more kinds.

The filler preferably has a volume average particle diameter of 0.01 μm to 10 μm from the viewpoint of (i) achievement of good adhesion and good slidability of the porous film and (ii) formability of the porous film. The volume average particle diameter more preferably has a lower limit of not less than 0.1 μm and an upper limit of not more than 5 μm.

The filler is constituted by particles of any shape, which can be a spherical shape, an elliptical shape, a plate shape, a bar shape, or an indefinite shape. From the viewpoint of prevention of occurrence of a short circuit in the battery, the particles are preferably (i) plate-shaped particles or (ii) primary particles that have not aggregated.

The filler allows the porous film to be more slidable by forming fine irregularities on a surface of the functional layer. The filler which is constituted by (i) plate-shaped particles or (ii) primary particles that have not aggregated forms finer irregularities on the surface of the functional layer, so that the functional layer more closely adheres to the electrode.

The functional layer contains the filler in an amount preferably of 1 mass % to 30 mass % with respect to a total amount of the PVDF-based resin and the filler. The functional layer which contains the filler in an amount of not less than 1 mass % easily yields an effect of improving slidability of the separator by forming fine irregularities on the surface of the functional layer. From this viewpoint, the functional layer more preferably contains the filler in an amount of not less than 3 mass %. Meanwhile, the functional layer which contains the filler in an amount of not more than 30 mass % allows mechanical strength of each of the functional layer and the separator to be maintained. With the arrangement, for example, in a case where an electrode body is produced by rolling up a stack of the electrodes and the separator, a crack and/or the like are/is less likely to occur in the separator. From this viewpoint, the functional layer contains the filler in an amount more preferably of not more than 20 mass %, and still more preferably of not more than 10 mass %.

In order to prevent an end surface of the porous film which is slit from being hairy, being bent, and/or being contaminated with a dust produced due to the slitting, the functional layer contains the filler in an amount preferably of not less than 1 mass %, and more preferably of not less than 3 mass %, with respect to a total amount of the PVDF-based resin and the filler.

Second Embodiment

Further, the functional layer included in the second porous layer is exemplified by a functional layer containing fine resin particles and a functional layer containing an aggregate of fine resin particles. The fine resin particles are preferably made of a resin having a C2-C4 α-olefin-derived structure unit or a PVDF-based resin, and are more preferably made of a resin having a C2-C4 α-olefin-derived structure unit. The porous film which includes such a functional layer is excellent in ion permeability and handleability, and makes it possible to achieve good adhesion between the porous film and the electrode which are bonded together by hot pressing.

Such a functional layer can contain a binder resin in addition to the fine resin particles. The binder resin is preferably a polymer (i.e., a binder resin) that (i) has a characteristic of causing the fine resin particles to be bound to one another, (ii) is insoluble in the electrolyte solution of the battery, and (iii) is electrochemically stable while the battery is in use. The binder resin can be a water-soluble polymer or a water-insoluble polymer.

Examples of the binder resin include polyolefins such as polyethylene and polypropylene; fluorine-containing resins such as polyvinylidene fluoride and polytetrafluoroethylene; fluorine-containing rubbers such as a vinylidene fluoride-hexafluoropropylene-tetrafluoroethylene copolymer and an ethylene-tetrafluoroethylene copolymer; rubbers such as a styrene-butadiene copolymer and a hydride thereof, a methacrylic acid ester copolymer, an acrylonitrile-acrylic acid ester copolymer, a styrene-acrylic acid ester copolymer, ethylene propylene rubber, and polyvinyl acetate; resins having a melting point or a glass transition temperature of not less than 180° C., such as polyphenylene ether, polysulfone, polyether sulfone, polyphenylene sulfide, polyetherimide, polyamide, polyimide, polyamide imide, polyetheramide, and polyester; and polymers such as polyvinyl alcohol, polyethyleneglycol, cellulose ethers, sodium alginate, polyacrylic acid, polyacrylamide, and polymethacrylic acid. These binder resins can be used alone or can be used in combination of two or more kinds that are mixed. Examples of the cellulose ethers include carboxymethyl cellulose (CMC), hydroxyethyl cellulose (HEC), carboxy ethyl cellulose, methyl cellulose, ethyl cellulose, cyan ethyl cellulose, oxyethyl cellulose, and the like.

Such a functional layer can further contain a filler. The functional layer preferably contains the filler in an amount of 20 mass % to 80 mass % with respect to a total mass of the fine resin particles and the filler. Meanwhile, the functional layer preferably contains the filler in an amount of 15 vol % to 90 vol % with respect to a total volume of the fine particles and the filler. Further, the fine particles are contained in an amount of 0.1 g/m² to 6.0 g/m² per functional layer. The filler can be suitably exemplified by the fillers listed as examples in the first embodiment.

Examples of an arrangement of the aggregate of the fine resin particles include the following arrangements (i) and (ii):

(i) the arrangement such that the fine resin particles, which are primary particles, are fixed to the first porous layer or such that an aggregate of the fine resin particles or an aggregate of the fine resin particles and the filler (secondary particles) is fixed to the first porous layer.

(ii) the arrangement such that adjacent fine resin particles or the fine resin particles and the filler are integrally connected so as be in layers, and at least a part of the fine resin particles in the layers are fixed to a surface of the first porous layer, so that the layers as a whole are fixed to (integrated into) the first porous layer.

It can be confirmed, by observing a surface of the porous film (a surface of the functional layer) by use of a scanning electron microscope (SEM), that the fine resin particles constitute the aggregate.

The fine resin particles preferably maintain a particulate form in the functional layer. The expression "maintaining a particulate form" refers to, for example, a state in which a boundary surface between the respective fine resin particles is identifiable in a case where the porous film is observed by use of the scanning electron microscope.

The fine resin particles have an average particle diameter preferably of 0.01 μm to 1 μm, more preferably of 0.02 μm to 1 μm, and particularly preferably of 0.05 μm to 1 μm.

The fine resin particles which have an average particle diameter of not less than 0.01 μm allow the porous film to be excellent in slidability and handleability. Meanwhile, the fine resin particles which have an average particle diameter of not more than 1 μm make it easier for the functional layer to have a uniformly small thickness.

The fine resin particles are contained in an amount of 0.1 g/m² to 6.0 g/m², and preferably in an amount in a range of 1.0 g/m² to 3.0 g/m², per functional layer. The fine resin particles which are contained in an amount of not less than 0.1 g/m² per functional layer allows better adhesion between the porous film and the electrode. Meanwhile, the fine resin particles which are contained in an amount of not more than 6.0 g/m² per functional layer allows an ion to be easily transmitted through the porous film and allows the battery to have a better load characteristic.

The PVDF-based resin can be suitably exemplified by the PVDF-based resins which are listed as examples in the first embodiment.

The C2-C4 α-olefin is exemplified by ethylene, propylene, 1-butene, and the like, and is preferably ethylene. The resin having the C2-C4 α-olefin-derived structure unit can be a copolymer of (i) any of the above C2-C4 α-olefins and (ii) another monomer. Examples of the another monomer include fatty acid vinyls such as vinyl acetate, vinyl propionate, vinyl butyrate, vinyl laurate, vinyl caproate, vinyl stearate, vinyl palmitate, and vinyl versatate; acrylic acid esters each having a C1-C16 alkyl group, such as methyl acrylate, ethyl acrylate, propyl acrylate, butyl acrylate, hexyl acrylate, octyl acrylate, and lauryl acrylate; methacrylic acid esters each having a C1-C16 alkyl group, such as ethyl methacrylate, propyl methacrylate, butyl methacrylate, hexyl methacrylate, octyl methacrylate, and lauryl methacrylate; acidic group-containing vinyl monomers such as acrylic acid, methacrylic acid, 2-acryloyloxyethyl succinate, 2-methacryloyloxyethyl succinate, carboxy ethyl acrylate, and carboxy ethyl methacrylate; aromatic vinyl monomers such as styrene, benzyl acrylate, and benzyl methacrylate; dienes such as 1,3-butadiene and isoprene; acrylonitriles; and the like. Among these monomers, a fatty acid vinyl, an acrylic acid ester, or a methacrylic acid ester is preferable, and a vinyl acetate or an ethyl acrylate is more preferable.

The resin having the C2-C4 α-olefin-derived structure unit is preferably a resin having the C2-C4 α-olefin and a structure unit derived from the another monomer, and is more preferably a resin having a structure unit derived from at least one kind selected from the group consisting of a fatty acid vinyl, an acrylic acid ester, and a methacrylic acid ester, and the C2-C4 α-olefin-derived structure unit.

<Heat-Resistant Layer>

The heat-resistant layer only needs to contain a heat-resistant material and be heat resistant at a high temperature at which a shutdown occurs, and is not particularly limited in other arrangement.

The second porous layer which includes the heat-resistant layer can have shape stability even at a high temperature. Note that the heat-resistant material is herein defined as a material that is neither melted nor thermally decomposed at a temperature at which the first porous layer is melted (e.g., approximately 130° C. in a case where the first porous layer is made of polyethylene).

Examples of the heat-resistant material include a heat-resistant resin, a filler-containing heat-resistant resin composition, and the like.

Examples of the heat-resistant resin include polyamide, polyimide, polyamide imide, polycarbonate, polyacetal, polysulfone, polyphenylene sulfide, polyether ether ketone, aromatic polyester, polyether sulfone, polyetherimide, cellulose ethers, and the like. These heat-resistant resins can be used alone or can be used in combination of two or more kinds that are mixed.

Among the above heat-resistant resins, from the viewpoint of a further increase in heat resistance, polyamide, polyimide, polyamide imide, polyether sulfone, or polyetherimide is preferable, polyamide, polyimide, or polyamide imide is more preferable, a nitrogen-containing aromatic polymer such as aromatic polyamide (para-oriented aromatic polyamide, meta-oriented aromatic polyamide), aromatic polyimide, or aromatic polyamide imide is still more preferable, and aromatic polyamide is especially preferable. From the viewpoint of heat resistance, para-oriented aromatic polyamide (hereinafter also referred to as "para-aramid") is particularly preferable.

Para-aramid can be obtained by condensation polymerization of para-oriented aromatic diamine and para-oriented aromatic dicarboxylic acid halide, and substantially includes repeating units in which amide bonds are bonded at para orientation positions or quasi-para orientation positions (for example, orientation positions that extend coaxially or parallel in opposite directions as in 4,4'-biphenylene, 1,5-naphthalene, 2,6-naphthalene, or the like) of aromatic rings. Examples of the para-aramid include para-aramids each having a para-oriented structure or a quasi-para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and a paraphenylene terephthalamide/2,6-dichloroparaphenylene terephthalamide copolymer.

The aromatic polyimide is preferably wholly aromatic polyimide produced by condensation polymerization of an aromatic diacid anhydride and a diamine. Examples of the diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

Examples of the aromatic polyamide imide include aromatic polyamide imide obtained by condensation polymerization of aromatic dicarboxylic acid and aromatic diisocyanate, and aromatic polyamide imide obtained by condensation polymerization of aromatic diacid anhydride and aromatic diisocyanate. Examples of the aromatic dicarboxylic acid include isophthalic acid and terephthalic acid. Examples of the aromatic diacid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylane diisocyanate, and m-xylene diisocyanate.

Examples of the cellulose ethers include carboxymethyl cellulose (CMC), hydroxyethyl cellulose (HEC), carboxy ethyl cellulose, methyl cellulose, ethyl cellulose, cyan ethyl cellulose, oxyethyl cellulose, and the like. Among these cellulose ethers, CMC or HEC, which has excellent chemical and thermal stability, is preferable, and CMC is more preferable.

The filler can be an organic filler or an inorganic filler. Examples of the organic filler include fine particles made of a homopolymer of a monomer such as styrene, vinyl ketone, acrylonitrile, methyl methacrylate, ethyl methacrylate, glycidyl methacrylate, glycidyl acrylate, or methyl acrylate, or a copolymer of two or more of such monomers; a fluorine-based resin such as polytetrafluoroethylene, a tetrafluoroethylene-hexafluoropropylene copolymer, a tetrafluoroethylene-ethylene copolymer, or polyvinylidene fluoride (polyvinylidene fluoride-based resin); melamine resin; urea resin; polyethylene; polypropylene; polymethacrylate; or the like.

Examples of the inorganic filler include fine particles made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, alumina (e.g., α-alumina), mica, zeolite, glass, or the like.

Alternatively, it is possible to use a material similar to the filler, such as a hydrate of the filler. Such fillers can be used alone or can be used in combination of two more kinds that are mixed.

Among these fillers, from the viewpoint of a further increase in chemical stability and shape stability at a high temperature, a filler made of an inorganic oxide is preferable, and in particular, a filler made of α-alumina is more preferable.

Note that the filler is preferably a filler capable of forming pores sufficiently enough to ensure ion permeability of the second porous layer.

With respect to 100 wt % of a total of the heat-resistant resin and the filler, the filler can be contained in a weight proportion of 20 wt % to 99 wt %, and is contained preferably of 30 wt % to 99 wt %, more preferably of 40 wt % to 99 wt %, more preferably of 50 wt % to 99 wt %, and still more preferably of 60 wt % to 99 wt %. The filler which is contained in a weight proportion that falls within the above specific range makes it possible to obtain the second porous layer which has an excellent balance between ion permeability and less likelihood of powder falling. Note that powder falling is a phenomenon in which a filler is peeled off of a porous film.

The heat-resistant layer can contain component(s) different from the heat resistant material, provided that component does/do not impair the function of the heat-resistant layer. Examples of the component(s) include a dispersing agent, a plasticizing agent, and a pH adjusting agent.

The heat-resistant layer has a thickness normally of 1 μm to 25 μm, and preferably of 5 μm to 20 μm. The heat-resistant layer which has a thickness of not less than 1 μm can prevent thermal shrinkage in the first porous layer, the thermal shrinkage being caused by heat generation occurring in the battery by an accident or the like, and consequently can avoid shrinkage in the separator. Meanwhile, the heat-resistant layer which has a thickness of not more than 25 μm can prevent the second porous layer from having a too large thickness, and consequently can avoid causing the battery to have a smaller capacity. In a case where the porous film includes a plurality of heat-resistant layers, the plurality of heat-resistant layers only needs to have a total thickness falling within the above range.

[3. Method for Producing Porous Film Including First Porous Layer and Second Porous Layer]

A method for producing the porous film including the first porous layer and the second porous layer is not particularly limited to any specific method provided that the porous film can be obtained, and the porous film can be produced by various methods.

For example, in a case where the second porous layer is made of a PVDF-based resin and has a structure in which skeletons are connected to one another in a form of a three-dimensional network, the porous film can be produced by a method in which the second porous layer is integrally formed on the first porous layer by (i) forming a coating layer by coating the first porous layer (base material) with a coating solution containing a PVDF-based resin and then (ii) solidifying the PVDF-based resin of the coating layer.

The second porous layer which contains a PVDF-based resin can be formed by, for example, the wet coating method below. First, a coating solution can be prepared by dissolving a PVDF-based resin in a solvent and dispersing a filler in a resultant solution. This coating solution is applied to the first porous layer, and then the first porous layer is immersed in an appropriate solidifying liquid so as to solidify the PVDF-based resin while inducing phase separation. After the above steps have been carried out, a PVDF-based resin-containing layer having a porous structure is formed on the first porous layer. Then, this layer, which has the porous structure, is washed with water and dried, so that the solidifying liquid is removed from the layer.

For example, the wet coating method is exemplified the following Methods 1 and 2.

(Method 1)

Method 1 includes the steps of:

(a) preparing a solution in which a PVDF-based resin is dissolved in a solvent;

(b) forming a coating film by applying the solution to the first porous layer;

(c) depositing the PVDF-based resin out of the coating film, which is in a wet state, by, for example, immersing the coating film in a solvent that does not dissolve the PVDF-based resin;

(d) optionally further immersing, in the solvent that does not dissolve the PVDF-based resin, the coating film, out of which the PVDF-based resin, which was in the wet state, has been deposited, and washing the coating film; and (e) drying the coating film, out of which the PVDF-based resin, which was in the wet state, has been deposited.

(Method 2)

Method 2 includes the steps of:

(a) preparing a coating solution in which a PVDF-based resin, which can be fine particles, is dispersed in an aqueous solution in which a binder resin is optionally dissolved in water;

(b) forming a coating film by applying the coating solution to the first porous layer; and (c) removing the water by drying the coating film.

The following description specifically discusses a wet coating method that is suitable for an aspect of the present invention.

Suitable examples of a solvent (hereinafter also referred to as a "good solvent") that is used to prepare a coating solution and dissolves a PVDF-based resin include polar amide solvents such as N-methyl-2-pyrrolidone (NMP), dimethylacetamide, and dimethylformamide.

In order to form a good porous structure, the good solvent is preferably mixed with a phase separating agent for inducing phase separation. Examples of the phase separating agent include water, methanol, ethanol, propyl alcohol, butyl alcohol, butanediol, ethylene glycol, propylene glycol, tripropylene glycol, and the like. The phase separating agent is preferably added in an amount that makes it possible to allow the coating solution to have a viscosity suitable for coating.

In order to form a good porous structure, the solvent is preferably a mixed solvent that contains (i) the good solvent in an amount of not less than 60 mass % and (ii) the phase separating agent in an amount of 5 mass % to 40 mass %. In order to form a good porous structure, the coating solution preferably contains a PVDF-based resin at a concentration of 3 mass % to 10 mass %.

The solidifying liquid typically contains water, and the good solvent and the phase separating agent, which are used to prepare the coating solution. In terms of production, the good solvent and the phase separating agent are preferably mixed at a ratio equal to that of the mixed solvent which is used to dissolve the PVDF-based resin. From the viewpoint of formation of a porous structure and productivity, the water is preferably contained at a concentration of 40 mass % to 90 mass %.

The coating solution can be applied to the first porous layer by a conventional coating method such as a Meyer bar, a die coater, a reverse roll coater, or a gravure coater.

The second porous layer can also be produced by not only the wet coating method described earlier but also a dry coating method. Note here that the dry coating method is a method in which a porous layer is obtained by applying, to the first porous layer, a coating solution containing a PVDF-based resin, a filler, and a solvent, and drying a resultant coating layer so as to remove the solvent by volatilization. Note, however, that the dry coating method is more likely to cause the coating layer to be closely packed, as compared with the wet coating method. Thus, the wet coating method is preferable because the wet coating method makes it possible to obtain a good porous structure.

The porous film can also be produced by a method in which the second porous layer is produced as a separate sheet, the second porous layer is placed on the first porous layer, and the second porous layer is combined with the first porous layer by thermocompression or by use of an adhesive. The second porous layer can be produced as a separate sheet by, for example, a method in which a coating solution containing a PVDF-based resin and a filler is applied to a release sheet, the second porous layer is formed by employing the wet coating method or the dry coating method (described earlier), and the second porous layer is released from the release sheet.

Further, a method for producing the second porous layer by use of fine resin particles includes: a coating step of applying, to one surface or both surfaces of the first porous layer, a dispersion containing the fine resin particles and a filler; and a drying step of drying the dispersion with which the one surface or both the surfaces of the first porous layer has been coated.

By removing a solvent contained in the dispersion, the porous film including the first porous layer and the second porous layer is obtained.

In the coating step, the dispersion is preferably applied to the one surface or both the surfaces of the first porous layer so that the fine resin particles are contained in an amount of 0.1 $g/m^2$ to 6.0 $g/m^2$ per layer.

The dispersion is prepared by dispersing, suspending, or emulsifying, in the solvent, the fine resin particles and, optionally, the filler, the fine resin particles and the filler each being in a solid state. The dispersion thus prepared serves as the coating solution to be applied to the first porous layer. The dispersion can be an emulsion or a suspension.

The solvent is not particularly limited provided that the solvent does not dissolve the fine resin particles but allows the fine resin particles to be dispersed, suspended, or emulsified. Examples of the solvent include organic solvents such as water; alcohols such as methanol, ethanol, and 2-propanol; acetone; tetrahydrofuran; methyl ethyl ketone; ethyl acetate; N-methylpyrrolidone; dimethylacetamide; and dimethylformamide.

The coating solution can further contain a publicly known thickening agent provided that the thickening agent allows the coating solution to have a viscosity suitable for coating. A publicly known surfactant can also be contained so that the fine resin particles and the filler are more dispersible in the dispersion.

The fine resin particles are contained in the dispersion in a proportion of 1 mass % to 50 mass % with respect to a total mass of the dispersion.

The dispersion can be applied to the first porous layer by a conventional coating method such as a Meyer bar, a die coater, a reverse roll coater, a gravure coater, a micro-gravure coater, or a spray coat. In a case where the fine resin particles are fixed to both front and back surfaces of the first porous layer, the dispersion can be applied to one of the surfaces at a time and then dried. Note, however, that from the viewpoint of productivity, the dispersion is preferably simultaneously applied to both the surfaces of the first porous layer and then dried.

In the drying step, the dispersion, which has been applied to the first porous layer in the coating step, is dried.

By drying the dispersion which has been applied to at least one of the surfaces of the first porous layer, the functional layer which contains the filler and an aggregate of the fine resin particles can be formed while the solvent contained in the dispersion is evaporated.

The fine resin particles of the functional layer which fine resin particles have been obtained by being subjected to the drying step preferably maintains a particulate form. The fine resin particles which are subjected to the drying step can function as a binder so as to cause the functional layer as a whole to be integrally formed on the first porous layer.

In a case where the second porous layer is a heat-resistant layer, the method for producing the porous film including the first porous layer and the second porous layer is exemplified by a method in which the first porous layer and the second porous layer are separately produced and combined; and a method in which a coating solution containing a solvent and components of the second porous layer is prepared and applied to the first porous layer, and the solvent is removed. The latter of these methods is simpler and more preferable.

The solvent is a solvent or a disperse medium, and only needs to be a solvent capable of uniformly and stably dissolving or dispersing the components of the second porous layer. Examples of the solvent include water; alcohols such as methanol, ethanol, and isopropanol; acetone; toluene; xylene; hexane; N-methylpyrrolidone; N,N-dimethylacetamide; N,N-dimethylformamide; and the like. These solvents can be used alone or can be used in combination of two or more kinds that are mixed, provided that the two or more kinds are compatible with each other.

In terms of a process and an environmental load, the solvent preferably contains water in an amount of not less than 80 wt %, and more preferably contains only water.

The coating solution can be applied to the first porous layer by any method that is not particularly limited provided that the method allows uniform wet coating, and the coating solution can be applied by a conventionally publicly known method. For example, the coating solution can be applied by a capillary coating method, a spin coating method, a slit die coating method, a spray coating method, a roll coating method, a screen printing method, a flexographic printing method, a bar coater method, a gravure coater method, a die coater method, or the like. A thickness of the second porous layer can be controlled by adjusting an applied amount and a concentration of the coating solution. Normally, a process for applying the coating solution to the first porous layer and a process for removing the solvent from the coating solution which has been applied to the first porous layer are sequentially carried out while the first porous layer is being transferred. With the arrangement, even in a case where the first porous layer is long, the first porous layer and the second porous layer can be sequentially stacked.

The coating solution can be obtained by any method that is not particularly limited provided that the method makes it possible to obtain a homogeneous coating solution. The coating solution which contains a filler is preferably obtained by any of the following methods: a mechanical stirring method, an ultrasonic dispersion method, a high-pressure dispersion method, a media dispersion method, and the like. Among these methods, a high-pressure dispersion method is more preferable because the high-pressure dispersion method makes it easy to more uniformly disperse a filler. In a case where the coating solution is obtained, a heat-resistant resin and other component(s) such as a filler can be mixed with a solvent in any order provided that there is no particular problem (e.g., production of a precipitate). Specifically, the heat-resistant resin and the other component(s) can be mixed with the solvent by any method such as a method in which the heat-resistant resin and the other component(s) are applied to the solvent at a time and mixed with the solvent; a method in which the heat-resistant resin and the other component(s) are applied to the solvent in any order and mixed with the solvent; a method in which the heat-resistant resin and the other component(s) are dissolved or dispersed in respective solvents and the solvents are mixed; or the like.

In a case where the solvent contained in the coating solution contains water, it is preferable to carry out a hydrophilization treatment with respect to the first porous layer in advance before applying the coating solution to the first porous layer. The first porous layer which is subjected to a hydrophilization treatment allows the first porous layer to be more coatable. This makes it possible to obtain the second porous layer which is more homogeneous. The hydrophilization treatment is effective particularly in a case where the solvent contains water at a high concentration.

Examples of the hydrophilization treatment include a chemical treatment by use of an acid, an alkali, or the like; a corona treatment; a plasma treatment; and the like.

Among the above hydrophilization treatments, a corona treatment is preferable in that the corona treatment not only allows the first porous layer to be hydrophilized in a relatively short time, but also causes polyolefin to be reformed due to corona discharge only at a surface and its vicinity of the first porous layer, and allows the first porous layer to be more coatable without the fear that a property of an inside of the first porous layer may be changed.

The solvent is removed, preferably by drying, which is simple, from the coating solution which has been applied to the first porous layer. Examples of a drying method include natural drying, blow drying, heat drying, drying under reduced pressure, and the like. Among these drying methods, heat drying is preferable. Though depending on a solvent to be used, drying is carried out at a temperature preferably of 30° C. to 80° C., and more preferably of 50° C. to 80° C. In a case where drying is carried out at a temperature of not less than 30° C., drying can be carried out at a sufficient speed. In a case where drying is carried out at a temperature of not more than 80° C., a porous film having a good appearance can be obtained.

[4. Porous Film (A) Having Water Content Percentage of not Less than 1000 ppm]

A method for producing a porous film (A) having a water content percentage of not less than 1000 ppm (hereinafter may be referred to as a "porous film (A)") is not particularly limited. Note, however, that the porous film (A) is normally obtained by storing, in the atmosphere, a porous film produced by the method described earlier. In other words, in a case where the porous film is stored in the atmosphere, the porous film absorbs or adsorbs moisture in the atmosphere and naturally has a water content percentage of not less than 1000 ppm.

The porous film (A) which has a water content percentage of not less than 1000 ppm has a water content percentage preferably of not less than 1500 ppm, and more preferably of not less than 2000 ppm.

[5. Method for Producing Porous Film Having Water Content Percentage of Less than 1000 ppm]

A package is obtained by causing the porous film (A) thus obtained and having a water content percentage of not less than 1000 ppm and a drying agent to be contained in a water vapor barrier packaging container and sealing the water vapor barrier packaging container.

The drying agent is contained in an amount preferably of not less than X mass %, more preferably of not less than X % and not more than (X+20)%, still more preferably of not less than X % and not more than (X+10)%, and still more preferably of not less than X % and not more than (X+5)%, with respect to a mass of the porous film (A).

The X can be calculated based on the following equation (I):

$$X=Y/(a\times 100) \qquad (I)$$

where a represents an amount of moisture absorption (g) per 100 g of the drying agent at a temperature of 24° C. and a humidity of 10%, and Y represents a water content percentage (ppm) of the porous film (A).

The drying agent is contained in an amount preferably of not less than 50 g, more preferably of not less than 90 g, and still more preferably of not less than 200 g. Further, the drying agent is contained in an amount preferably of not more than 2500 g, more preferably of not more than 2000 g, and still more preferably of not more than 1000 g.

The Y (water content percentage of the porous film (A)) is not less than 1000 ppm. The Y is preferably not more than 100000 ppm, and more preferably not more than 50000 ppm. The Y which is not less than 100000 ppm causes the drying agent to be contained in a large amount with respect to the porous film. This may lower efficiency with which to produce a porous film having a water content percentage of less than 1000 ppm.

The water content percentage of the porous film (A) may change depending on an external environment. Thus, the water content percentage of the porous film (A) is preferably measured after the porous film (A) is stored in an environment in which the water content percentage of the porous film (A) does not change. Further, the water content percentage of the porous film (A) is preferably measured within one hour before the porous film (A) is contained in the water vapor barrier packaging container.

The water content percentage of the porous film (A) can be measured by a method described in Examples described later.

The a is normally 1 g to 20 g, and preferably 3 g to 10 g. The a can be adjusted by adjusting component(s) of the drying agent.

The drying agent is not particularly limited provided that the drying agent is capable of absorbing water at a temperature of 24° C. and a humidity of 10%. For example, the drying agent is exemplified by silica gel, quick lime, calcium chloride, silica alumina gel, and the like. The drying agent is preferably either of silica gel and calcium chloride from the viewpoint of handleability, and is particularly preferably silica gel from the viewpoint of safety and cost.

The drying agent is normally used while being contained in a bag. The bag has, at a temperature of 40° C. and a humidity of 90% RH, a water vapor transmittance which is higher than that of the water vapor barrier packaging container of an aspect of the present invention and is normally 1000 g/m²/24 hr to 5000 g/m²/24 hr.

The drying agent is contained in one bag in an amount normally of 0.5 g to 300 g, preferably of 1 g to 200 g, and more preferably of 10 g to 100 g. The drying agent which is contained in an amount falling within the above range tends to allow drying of the porous film to more satisfactorily proceed.

The drying agent which is contained in the water vapor barrier packaging container which has not been sealed has a water content percentage normally of 100 ppm to 10000 ppm, preferably of 300 ppm to 5000 ppm, and more preferably of 500 ppm to 3000 ppm.

The drying agent which is contained in the water vapor barrier packaging container is preferably provided at a place where no damage is caused to the porous film. Specifically, a method for providing the drying agent is exemplified by, for example, a method in which the drying agent is fitted to a fixing jig provided on either side of the porous film, or a method in which the drying agent is attached to an inner surface of the water vapor barrier packaging container. In a case where the porous film is a roll, the drying agent can be contained in a space at a central part of the roll (e.g., a roll core).

The package of an aspect of the present invention is specifically exemplified by, for example, a package illustrated in FIG. 1. The package illustrated in FIG. 1 is a package in which a drying agent 11 is fitted to a fixing jig 13 provided on either side of a porous film 10. Note here that the drying agent 11 can be contained in a space at a central part of the porous film 10, which is a roll (e.g., in an inner part of a roll core 14).

Examples of the water vapor barrier packaging container include an aluminum foil laminated bag, an aluminum vapor-deposited bag, an aluminum oxide vapor-deposited bag, a silicon oxide vapor-deposited bag, a polyvinylidene chloride laminated bag, a stretched polyethylene bag, a stretched polypropylene laminated bag, a resin coating film, a paper barrier package, and the like. The water vapor barrier packaging container is preferably an aluminum vapor-deposited bag from the viewpoint of a water vapor barrier property.

The water vapor barrier packaging container has a bag thickness preferably of 40 μm to 90 μm, and more preferably of 50 μm to 80 μm. The water vapor barrier packaging container which has a bag thickness of not more than 90 μm is highly handleable. Further, the water vapor barrier packaging container which has a bag thickness of not less than 40 μm has a sufficiently high water vapor barrier property. This easily allows drying of the porous film to satisfactorily proceed.

The water vapor barrier packaging container has, at a temperature of 40° C. and a humidity of 90% RH, a water vapor transmittance preferably of 0.1 g/m²/24 hr to 5 g/m²/24 hr, more preferably of 0.1 g/m²/24 hr to 3 g/m²/24 hr, and still more preferably of 0.1 g/m²/24 hr to 1 g/m²/24 hr. The water vapor barrier packaging container which has a water vapor transmittance of not more than 5 g/m²/24 hr at a temperature of 40° C. and a humidity of 90% RH tends to allow drying of the porous film to more satisfactorily proceed. Meanwhile, the water vapor barrier packaging container which has a water vapor transmittance of less than 0.1 g/m²/24 hr causes problems such as an increase in cost of a packaging container and a deterioration in workability during packaging due to an increase in bag thickness of the packaging container.

A method for sealing the water vapor barrier packaging container is not particularly limited provided that the method allows a dry state in the packaging container to be maintained. The water vapor barrier packaging container can be sealed by, for example, folding an opening part thereof inward, tying the opening part, twisting the opening part, fastening the opening part with an adhesive tape, fastening the opening part with a zipper, heat-sealing the opening part, or the like. Though depending on a material of the water vapor barrier packaging container, the water vapor barrier packaging container is sealed normally by heat sealing. Alternatively, the water vapor barrier packaging container can also be sealed by impulse sealing or fusing sealing.

The package obtained by sealing the water vapor barrier packaging container is stored for a period preferably of not less than 1 hour, more preferably of not less than 5 hours, still more preferably of not less than 12 hours, still more preferably of not less than 24 hours, and still more preferably of not less than 7 days. The package which is stored for not less than 1 hour tends to allow the porous film (A), which has been packaged, to be sufficiently dried.

The package obtained by sealing the water vapor barrier packaging container only needs to be stored at a normal environmental temperature. The package is stored at a temperature preferably of 0° C. to 40° C., and more preferably of 23° C. to 25° C. Further, the package only needs to be stored at a normal environmental humidity. The package is stored at a humidity preferably of 10% to 70%, and more preferably of 40% to 60%.

The porous film (A) which is packaged in the package can be a sheet, or a roll wound on a bobbin or the like. In a case where the porous film (A) which is a roll is subjected to vacuum drying or heat drying so that moisture is removed, not only deformation such as warpage but also weaving may occur in the porous film (A). The roll in which weaving has occurred causes a significant deterioration in workability during production of a battery. Thus, for the porous film (A) which is a roll, the production method of an aspect of the present invention is particularly suitably employed.

In a case where the water vapor barrier packaging container is unsealed and the porous film is taken out of the package, the porous film which has a water content percentage of less than 1000 ppm is obtained. In this case, the porous film which is taken out in a drying chamber can be prevented from absorbing and adsorbing moisture again.

In order to reduce an influence of moisture on the battery, the porous film which is taken out of the package which is obtained after being stored has a water content percentage preferably of not more than 700 ppm, more preferably of not more than 500 ppm, and still more preferably of not more than 200 ppm.

The water content percentage of the porous film can be measured by a method described in Examples described later.

The drying agent which is taken out of the package which is obtained after being stored has a water content percentage normally of 10000 ppm to 100000 ppm, preferably of 20000 ppm to 80000 ppm, and more preferably of 30000 ppm to 50000 ppm. The drying agent which has a water content percentage of not less than 10000 ppm is preferable because such a drying agent makes it easy to confirm that moisture in the porous film has been absorbed by the drying agent. Further, the drying agent can also be arranged to be made visually recognizable by adding thereto a component whose color changes in accordance with a moisture amount.

The water content percentage of the drying agent can be measured by a method described in Examples described later.

The drying agent which is taken out of the package which is obtained after being stored has an amount preferably of not less than 51 g, more preferably of not less than 90 g, and still more preferably of not less than 200 g. Further, the drying agent has an amount preferably of not more than 2530 g, more preferably of not more than 2000 g, and still more preferably of not more than 1000 g.

The drying chamber has a dew point preferably of not more than −20° C., more preferably of not more than −30° C., and still more preferably of not more than −40° C. The drying chamber which has a dew point of not more than −20° C. tends to allow the porous film which is taken out to have a water content percentage that is maintained at less than 1000 ppm.

In a case where the porous film which is taken out in the drying chamber is used to assemble the battery in the drying chamber, it is possible to reduce an influence of moisture to the battery.

[5. Nonaqueous Electrolyte Solution Secondary Battery]

A nonaqueous electrolyte solution secondary battery, which is a nonaqueous secondary battery that obtains an electromotive force by being doped and dedoped with lithium, only needs to include a cathode, an anode, and a separator, and is not particularly limited in other arrangement. A nonaqueous electrolyte solution secondary battery has a structure in which a battery element in which a structure including an anode and a cathode that face each other via a separator is impregnated with an electrolyte solution is encapsulated in an exterior member. A nonaqueous electrolyte solution secondary battery is suitable for a nonaqueous electrolyte secondary battery, and is particularly suitable for a lithium ion secondary battery. Note that doping means occlusion, support, adsorption, or insertion, and means a phenomenon in which lithium ions enter an active material of an electrode such as a cathode. A nonaqueous electrolyte solution secondary battery produced by using, as a separator, the porous film obtained by the production method of an aspect of the present invention has a high production yield due to excellent workability of the separator.

The cathode can have a structure in which an active material layer containing a cathode active material and a binder resin is formed on a collector. The active material layer can further contain an electroconductive auxiliary agent.

Examples of the cathode active material include a lithium-containing transition metal oxide and the like. Specific examples of the lithium-containing transition metal oxide include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, $LiAl_{1/4}Ni_{3/4}O_2$, and the like.

Examples of the binder resin include a PVDF-based resin. Examples of the electroconductive auxiliary agent include carbon materials such as acetylene black, Ketjen black, and graphite powder.

Examples of the collector include aluminum foil, titanium foil, stainless steel foil, and the like each having a thickness of 5 μm to 20 μm.

The anode can have a structure in which an active material layer containing an anode active material and a binder resin is formed on a collector. The active material layer can further contain an electroconductive auxiliary agent. Examples of the anode active material include a material capable of electrochemically occluding lithium. Specific examples of such a material include a carbon material; an alloy of (i) lithium and (ii) silicon, tin, aluminum, or the like; and the like.

Examples of the binder resin include a PVDF-based resin, styrene-butadiene rubber, and the like. A separator of an aspect of the present invention is sufficiently adhesive to the anode even in a case where styrene-butadiene rubber is used as an anode binder.

Examples of the electroconductive auxiliary agent include carbon materials such as acetylene black, Ketjen black, and graphite powder.

Examples of the collector include copper foil, nickel foil, stainless steel foil, and the like each having a thickness of 5 μm to 20 μm. Instead of the anode described earlier, metallic lithium foil can be used as the anode.

The electrolyte solution is a solution obtained by dissolving a lithium salt in a nonaqueous solvent. Examples of the lithium salt include $LiPF_6$, $LiBF_4$, $LiClO_4$, and the like.

Examples of the nonaqueous solvent include cyclic carbonates such as ethylene carbonate, propylene carbonate, fluoroethylene carbonate, and difluoroethylene carbonate; chain carbonates such as dimethyl carbonate, diethyl carbonate, ethyl methyl carbonate, and fluorine substitution products thereof; cyclic esters such as γ-butyrolactone and γ-valerolactone; and the like. These nonaqueous solvents can be used alone or can be used by being mixed.

The electrolyte solution is preferably obtained by mixing a cyclic carbonate and a chain carbonate at a mass ratio (cyclic carbonate/chain carbonate) of 20/80 to 40/60 and dissolving a 0.5M to 1.5M lithium salt in a resultant mixture.

Examples of the exterior member include a metal can, a pack made of an aluminum-laminated film, and the like. Examples of a shape of the battery include a rectangular shape, a cylindrical shape, a coin shape, and the like.

A nonaqueous electrolyte solution secondary battery can be produced by, for example, (i) impregnating, with an electrolyte solution, a laminated body including a cathode, an anode, and a separator provided between the cathode and the anode, (ii) causing the laminated body to be contained in an exterior member (e.g., a pack made of an aluminum-laminated layer film), and (iii) pressing the laminated body via the exterior member.

In a case where a porous film including a functional layer having an adhesion function is used as a separator, such a separator can adhere to an electrode by being stacked on the electrode. Thus, though the above pressing is not a step essential to battery production, it is preferable to carry out the pressing so as to achieve better adhesion between an electrode and a separator. Further, in order to achieve better adhesion between an electrode and a separator, it is preferable to carry out the pressing while the electrode and the separator are being heated (hot pressing).

A separator can be provided between a cathode and an anode by (i) a method in which one or more sets of a cathode, a separator, and an anode that are provided in this order are stacked (a so-called stack method) or (ii) a method in which a cathode, a first separator, an anode, and a second separator are stacked in this order and a stack obtained by the stacking is wound up in a direction parallel to a length of the stack.

EXAMPLES

The following description more specifically discusses an aspect of the present invention with reference to the following Examples and Comparative Examples. Note, however, that the present invention is not limited by the Examples.

(1) Water Content Percentage of Porous Film:

(Water Content Percentage of Porous Film (A))

A porous film (A) was cut into three square pieces each measuring 8 cm×8 cm, and a trace moisture measurement device (CA-200, VA-230 manufactured by Mitsubishi Chemical Analytech Co., Ltd.) was used to measure a moisture amount detected by heating each of the three pieces to 150° C. at a flow rate of 200 mL/min under a nitrogen airflow. Then, a ratio of the moisture amount of each of the three pieces to a total weight of the porous film (A) which had not been heated at 150° C. was found as a water content percentage. An average of respective found water content percentages of the three pieces was set as a water content percentage of the porous film (A).

(Water Content Percentage of Porous Film Taken Out of Package)

A water content percentage of a porous film taken out of a package was found by dividing an amount of moisture contained in the porous film taken out of the package by a weight of the porous film taken out of the package. The amount of moisture contained in the porous film taken out of the package was calculated from (i) a difference between (a) a weight of the porous film (A) and (b) a weight of the porous film taken out of the package and (ii) an amount of moisture contained in the porous film (A).

(Water Content Percentage of Drying Agent Taken Out of Package)

A water content percentage of a drying agent taken out of the package was found by dividing, by a weight (W0) obtained after a drying agent taken out of a water vapor barrier packaging container had been dried at 110° C. under vacuum for 6 hours, a difference between (a) a weight (W1) of the drying agent taken out of the water vapor barrier packaging container and (b) W0.

(2) Measurement of Warpage

The porous film was taken out of the package at a temperature of 24° C. and a humidity of 50% and cut into square pieces each measuring 8 cm×8 cm, and a length by which an end of each of the pieces had been raised was measured. Further, an appearance of each of the pieces was evaluated by the following criteria. Note that C indicates a state in which a piece has completely curled, A and B are regarded as respective preferable states, and A is regarded as the most preferable state.

A: a state in which an end of a piece is not raised
B: a state in which an end of a piece is raised, but most of the other parts of the piece are not raised and are flat
C: a state in which a piece curls so as to be tubular while both ends thereof are brought closer to each other Example 1

To a mixture of 100 parts by weight of alumina fine particles (product name "AKP3000", manufactured by Sumitomo Chemical Co., Ltd.) and 3 parts by weight of carboxymethyl cellulose (model No. 1110, manufactured by Daicel FineChem Ltd.), water was added so that a resultant mixture had a solid content of 29 mass %. The resultant mixture was stirred and mixed two times by use of a planetary centrifugal mixer "Awatori (bubble removal) Rentaro" (Registered Trademark, manufactured by THINKY CORPORATION) at a room temperature and 2000 rpm for 30 seconds. To a resultant mixture, 14 parts by weight of 2-propanol was added. Then, the mixture to which the 2-propanol had been added was mixed, so that a coating solution having a solid content of 28 mass % was obtained. In order that a sum of a weight of the alumina fine particles contained in the coating solution and a weight of the carboxymethyl cellulose contained in the coating solution was 7.0 g per square meter, the obtained coating solution was applied, by a doctor blade method, to a polyethylene porous film (first porous layer, having a length of 950 m, a width of 0.19 m, a thickness of 17 μm, and a porosity of 36%), which had been subjected to a corona treatment at 20 W/(m²/min). A laminated body, which was a coated product obtained, was dried at 65° C. for 5 minutes, and then the laminated body was wound on a bobbin, so that a roll porous film (1) was obtained.

In an aluminum vapor-deposited bag (having a water vapor transmittance of 1 g/m²/24 hr at a temperature of 40° C. and a humidity of 90% RH), (i) the roll porous film (1) and (ii) 400 g of silica gel (having an amount of moisture absorption of 5 g per 100 g at a temperature of 24° C. and a humidity of 10%) contained in a bag having a higher water vapor transmittance (4000 g/m²/24 hr) at a temperature of 40° C. and a humidity of 90% RH than the aluminum vapor-deposited bag were contained. Then, the aluminum vapor-deposited bag was sealed by heat sealing, so that a package (1) was obtained. The roll porous film (1) which had not been contained in the aluminum vapor-deposited bag had a water content percentage of 4900 ppm and a mass (with a weight of the bobbin subtracted) of 3775 g.

That is, X is calculated based on the following equation:

$$X = 4900/(5 \times 100) = 9.8$$

Further, since 400 g of the silica gel is equivalent to 10.5 mass % of the mass of the porous film (1) of 3775 g, a drying agent was contained in an amount of not less than X mass % with respect to the mass of the porous film (1).

The obtained package (1) was stored in an atmosphere at a temperature of 24° C. and a humidity of 50% for 7 days, and then the package (1) was unsealed in the atmosphere, so that the roll porous film was taken out. The roll porous film taken out had no weaving. Shortly thereafter, respective water content percentages of the obtained porous film and the drying agent taken out were measured. As a result of the measurement, the porous film had a water content percentage of 771 ppm, and the drying agent had a water content percentage of 51000 ppm. Further, no deformation (e.g., warpage) occurred in the porous film, and thus the porous film was evaluated as A in a measurement of warpage.

Comparative Example 1

Comparative Example 1 obtained a roll porous film (2) as in the case of Example 1, except that Comparative Example 1 set a length of a polyethylene porous film at 1050 m.

The roll porous film (2) was contained in an aluminum vapor-deposited bag (having a water vapor transmittance of 1 g/m²/24 hr at a temperature of 40° C. and a humidity of 90% RH). Then, the aluminum vapor-deposited bag was sealed by heat sealing, so that a package (2) was obtained. The roll porous film (2) which had not been contained in the aluminum vapor-deposited bag had a water content percentage of 4900 ppm and a mass (with a weight of a bobbin subtracted) of 4270 g.

The obtained package (2) was stored in an atmosphere at a temperature of 24° C. and a humidity of 50% for 7 days, and then the package (2) was unsealed in the atmosphere, so that the roll porous film (2) was taken out. Shortly thereafter, a water content percentage of the obtained porous film was measured. As a result of the measurement, the porous film had a water content percentage of 4900 ppm.

Comparative Example 2

The roll porous film (2) was dried for 24 hours by use of a vacuum dryer heated at a temperature of 80° C. The roll porous film (2) which had not been contained in the vacuum dryer had a water content percentage of 4900 ppm.

Thereafter, the temperature of the vacuum dryer was lowered to 30° C., and nitrogen substitution was carried out with respect to an inside of the vacuum dryer. Then, the roll porous film was taken out of the vacuum dryer. The roll porous film taken out had weaving. Shortly thereafter, a water content percentage of the obtained porous film was measured. As a result of the measurement, the porous film had a water content percentage of 400 ppm. Further, deformation (e.g., warpage) occurred in the porous film, and thus the porous film was evaluated as B in the measurement of warpage.

INDUSTRIAL APPLICABILITY

A production method of the present invention makes it possible to obtain a porous film which has a low water content percentage and less warps. The porous film can be widely used in the field of production of nonaqueous electrolyte solution secondary batteries.

REFERENCE SIGNS LIST

10 Porous film
11 Drying agent
12 Water vapor barrier packaging container
13 Fixing jig
14 Roll core

The invention claimed is:

1. A sealed package comprising:
a sealed water vapor barrier packaging container;
a porous film (A) contained in the water vapor barrier packaging container and having a water content percentage of not less than 1000 ppm; and
a drying agent contained in the water vapor barrier packaging container in an amount of not less than X mass % with respect to a mass of the porous film (A), the X being calculated based on the following equation (I):

$$X = Y/(a \times 100) \quad (I)$$

where a represents an amount of moisture absorption (g) per 100 g of the drying agent at a temperature of 24° C. and a humidity of 10%, and Y represents a water content percentage (ppm) of the porous film (A).

2. The sealed package as set forth in claim 1, wherein the sealed package is stored for a period of not less than 1 hour after the package is sealed.

3. The sealed package as set forth in claim 2, wherein the water vapor barrier packaging container contains therein (i) the porous film which has a water content percentage of less than 1000 ppm and (ii) the drying agent.

4. The sealed package as set forth in claim 3, wherein the drying agent has a water content percentage of not less than 10000 ppm.

5. The sealed package as set forth in claim 1, wherein the water vapor barrier packaging container has a water vapor transmittance of 0.1 g/m2/24 hr to 5 g/m2/24 hr at a temperature of 40° C. and a humidity of 90% RH.

6. The sealed package as set forth in claim 1, wherein the porous film is a roll porous film.

7. The sealed package as set forth in claim 1, wherein the porous film is a nonaqueous secondary battery separator.

8. A sealed package comprising:
a sealed water vapor barrier packaging container;
a porous film contained in the water vapor barrier packaging container and having a water content percentage of less than 1000 ppm; and
a drying agent contained in the water vapor barrier packaging container and having a water content percentage of not less than 1000 ppm,
in a case where part of moisture contained in the drying agent is moved to the porous film so that the porous film has a water content percentage of 1000 ppm, the drying agent having, during drying, a mass that is not less than X' mass % with respect to a mass of a porous film (A'), which is the porous film to which the moisture has been moved, the X' being calculated based on the following equation:

$$X' = Y/(a \times 100)$$

where a represents an amount of moisture absorption (g) per 100 g of the drying agent at a temperature of 24° C. and a humidity of 10%, and Y' represents a water content percentage of 1000 ppm of the porous film (A'), which is the porous film to which the moisture has been moved.

* * * * *